(12) United States Patent
Ogata et al.

(10) Patent No.: US 6,607,442 B2
(45) Date of Patent: Aug. 19, 2003

(54) OPERATING APPARATUS AND SIGNAL-OUTPUT-MODULATING METHOD FOR THE SAME

(75) Inventors: Hiroki Ogata, Chiba (JP); Kazusato Tagawa, Chiba (JP); Hiroyuki Nakazawa, Chiba (JP)

(73) Assignee: Sony Computer Entertainment Inc., Tokyo (JP)

( * ) Notice: Subject to any disclaimer, the term of this patent is extended or adjusted under 35 U.S.C. 154(b) by 61 days.

(21) Appl. No.: 09/798,152

(22) Filed: Mar. 2, 2001

(65) Prior Publication Data

US 2002/0065134 A1 May 30, 2002

(30) Foreign Application Priority Data

Mar. 3, 2000 (JP) ........................................ 2000-059483
Feb. 28, 2001 (JP) ........................................ 2001-056008

(51) Int. Cl.⁷ .............................. A63F 13/06; G06F 3/03
(52) U.S. Cl. ............................... 463/37; 341/34; 338/47
(58) Field of Search .............................. 463/37; 341/20, 341/34; 338/47

(56) References Cited

U.S. PATENT DOCUMENTS

| | | | | |
|---|---|---|---|---|
| 4,493,219 A | * | 1/1985 | Sharp et al. | .................. 338/47 |
| 4,673,919 A | * | 6/1987 | Kataoka | ...................... 341/34 |
| 4,924,960 A | | 5/1990 | Crill | |
| 5,164,697 A | | 11/1992 | Kramer | |
| 5,349,370 A | | 9/1994 | Katayama et al. | |
| 5,640,152 A | | 6/1997 | Copper | |
| 5,659,334 A | | 8/1997 | Yaniger et al. | |
| 6,171,191 B1 | | 1/2001 | Ogata et al. | |

FOREIGN PATENT DOCUMENTS

| | | |
|---|---|---|
| EP | 0 940 162 A1 | 9/1999 |
| JP | 1-140636 | 9/1989 |
| JP | 6-38015 | 5/1994 |
| JP | 08-084076 A | 3/1996 |
| JP | 3040155 | 5/1997 |
| JP | 10-295937 | 11/1998 |
| TW | 191945 | 10/1992 |
| TW | 288636 | 10/1996 |

* cited by examiner

Primary Examiner—Andrew M. Dolinar (57) ABSTRACT

An operating apparatus and a signal-output modulating method therefor allow analogous operations to be implemented by use of press-operational operation elements that have conventionally been used for digital operations. In the operating apparatus, detecting elements are provided, each of which is formed of a resistant material and a conductive material. The detecting elements individually output analog signals corresponding to press-operations performed on the operation elements. An output-level range of an analog signal outputted from the detecting element is divided by a level divider into multiple levels, and an analog-digital (A-D) converter performs conversion thereof to digital signals corresponding to the output levels. In addition, the output levels of the individual digital signals outputted from the A-D converter are shifted by a level corrector 17 according to a predetermined corresponding reference, and the digital signals are thereby output.

25 Claims, 8 Drawing Sheets

OPERATING APPARATUS AND SIGNAL-OUTPUT-MODULATING METHOD FOR THE SAME

FIELD OF THE INVENTION

The present invention relates to an operating apparatus (also is referred to as "controller") used as a peripheral apparatus of an entertainment apparatus, such as a television (TV) game machine.

BACKGROUND OF THE INVENTION

Generally, with an entertainment apparatus such as a TV game machine, operations are executed using an operating apparatus. The operating apparatus has multiple operation buttons. A user operates these buttons in various manners and thereby controls the entertainment apparatus. This allows, for example, a character displayed on a TV receiver to move.

Many conventional operating apparatuses of this type have a cross-shaped or circular direction-commanding operation button arranged on a left side of a front face, and multiple multipurpose buttons arranged on a right side of the front face. The direction-commanding operation button and the multipurpose buttons are formed of tact switches or rubber switches. On and off operations of these switches allow the character to digitally move and allows the state of the character to digitally vary.

Thus, in the conventional entertainment apparatuses, the direction-commanding operation button and the multipurpose buttons have functions for digitally varying the character displayed on the TV receiver, but have no other functions. This causes problems in that the character movement and the character-state variation are discontinuous, so that views thereof on the screen are jerky.

To solve these problems, Japanese Unexamined Patent Application Publication No. 7-88252 proposed a game-machine operating apparatus that has an analog-type input device. According to this publication, the analog-type input device is configured of trackballs and joysticks, and the operating apparatus allows analogous control of a character displayed on TV-receiver screens. Another conventional technique for using an analog-type input device similar to the aforementioned type is disclosed in Japanese Unexamined Patent Application Publication No. 11-90042.

However, operational characteristics of the analog-type input device configured of trackballs, joysticks, and the like significantly differ from those of the direction-commanding operation button and the multipurpose buttons. For users who used to operate the direction-commanding operation button and the multipurpose buttons, it takes substantial time for them to become skilled in the operation of the proposed analog-type input devices, reducing the amusement properties that the entertainment apparatuses are supposed to provide.

SUMMARY OF THE INVENTION

The present invention is made under the described circumstances. Accordingly, an object of the invention is to allow analogous operations to be implemented using press-operational operation elements that have conventionally been used for digital operations.

In order to achieve the above object, according to one aspect of the present invention, an operating apparatus comprises press-operational operation elements; detecting elements for outputting analog signals corresponding to press-operations performed on the operation elements; a level-dividing means for dividing an output-level range of an analog signal that is outputted from each of the detecting elements according to a press-operation performed on each of the operation elements; an analog-digital converting means (A-D converting means) for converting the analog signal to digital signals corresponding to individual divisional output levels produced as a result of a dividing processing by the level-dividing means; and a level-correcting means for performing shifting of levels of the digital signals outputted from the A-D converting means and for outputting them, the shifting being performed according to a predetermined corresponding reference.

According to the operating apparatus as configured above, analog signals corresponding to press-operations performed on the operation elements. Therefore, using the press-operating operation elements allows analogous operations to be implemented.

Because of factors such as the variation in individualities of the detecting elements and the variation in voltages applied to the detecting elements, depending on the operating apparatus, variation may occur in the output-level range of an analog signal that is output from each of the detecting elements corresponding to the press-operation performed on the operation element. According to this variation, variation may also occur in the output-level range of digital signals that are output from the A-D converting means. The level-correcting means solves the problem of the variation in the digital signals, thereby allowing the digital signals to be output within a specific output-level range.

The level-correcting means may be arranged so as to permit the corresponding reference to be arbitrarily modified. The corresponding reference is used to shift the levels of a digital signal. According to this arrangement, for example, depending on an application to be operated by the operating apparatus, output levels of individual digital signals corresponding to press-operations may be arbitrarily shifted. In this case, the level-correcting means may be arranged to permit the corresponding reference to be modified according to control signals sent from an entertainment apparatus.

In addition, the arrangement may be such that, among output levels of the analog signal outputted from each of the detecting elements according to the press-operation performed on each of the operation elements, the level-dividing means recognizes an output level included in a predetermined level range to be the maximum level and to process it. According to this arrangement, the maximum output level of the analog signal to be outputted to the A-D converting means can be maintained to be constant, regardless of the variation in the individualities of the detecting elements and the variation in the voltage to be applied to the individual detecting elements.

Furthermore, the arrangement may be such that, among output levels of the analog signal outputted from each of the detecting elements according to the press-operation performed on each of the operation elements, the level-dividing means recognizes an output level included in a predetermined level range to be the minimum level and to process it. According to this arrangement, the minimum output level of the analog signal to be outputted to the A-D converting means can be maintained to be constant, regardless of the variations in the individual characteristics of the detecting elements and the variations in the voltages to be applied to the individual detecting elements.

According to another aspect of the present invention, a signal-output modulating method for an operating apparatus, which comprises detecting elements for outputting analog signals corresponding to press-operations performed on the operation elements, comprises a step of dividing an output-level range of an analog signal that is outputted from each of the detecting elements according to a press-operation performed on each of the operation elements; a step of converting the analog signal to digital signals corresponding to individual divisional output levels produced as a result of a dividing processing by the level-dividing means; and a step of performing shifting of levels of the digital signals outputted from analog-digital converting means (A-D converting means) and outputting them. The shifting is performed according to a predetermined corresponding reference.

The corresponding reference may be arranged to be arbitrarily modifiable. Also, the corresponding reference may be arranged to be modifiable according to control signals sent from an entertainment apparatus.

Furthermore, the signal-output modulating method may be arranged such that, among output levels of the analog signal output from each of the detecting elements according to the press-operation performed on each of the operation elements, an output level included in a predetermined level range is recognized to be the maximum level and is thereby processed. Furthermore, the signal-output modulating method may be arranged such that, among output levels of the analog signal output from each of the detecting elements according to the press-operation performed on each of the operation elements, an output level included in a predetermined level range is recognized to be the minimum level and is thereby processed.

As summarized above, according to the present invention, the analogous operations can be implemented by using press-operational operation elements. In addition, digital signals can be output according to the divisional levels obtained as a result of equally-dividing processing without being influenced by the variations in the individual characteristics of the detecting elements and the variations in the voltages applied to the individual detecting elements.

DESCRIPTION OF THE PREFERRED EMBODIMENTS

Hereinbelow, referring to the accompanying drawings, description will be given of an embodiment according to the present invention.

An operating apparatus of the present embodiment is connected to a television (TV) game machine, one of entertainment apparatuses. The operating apparatus allows a character displayed on display screens of a TV receiver to be digitally and analogously controlled.

Figure 1:
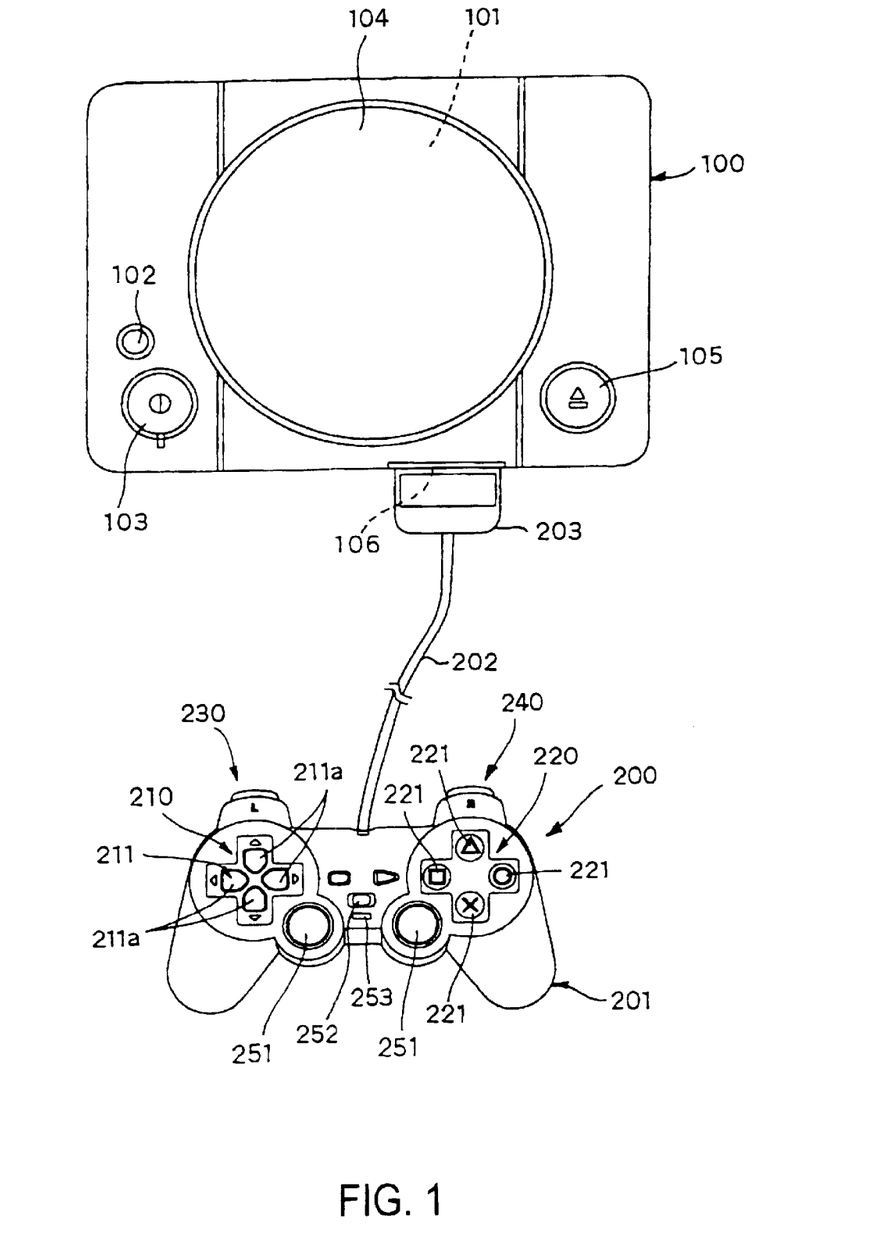
FIG. 1 is a plan view showing an outline of a television (TV) game machine for which an operating apparatus according to an embodiment of the present invention is used.

FIG. 1 is a schematic plan view of the TV game machine for which an operating apparatus 200 of the present embodiment is used. As shown therein, the TV game machine comprises a game-machine main unit 100 connected to a TV receiver that is used as a display, and an operating apparatus 200 connected to the game-machine main unit 100.

The game-machine main unit 100 houses component members, such as a disk-driving section 101 and an image-processing unit. The disk-driving section 101 works to read the contents of an optical disk in which a game program is recorded, and the image-processing unit works to display the character with background images on the TV receiver. In addition, the game-machine main unit 100 comprises a resetting switch 102 that is operated to reset a game during execution, a power switch 103, and a cover-opening-operation button 105 that is used to operate a cover 104 to open or shut on a disk-mounting section of the disk-driving section 101.

The operating apparatus 200 is connected to the game-machine main unit 100 via a connection cord 202 extending from an operation-apparatus main unit 201. A connector 203 is fitted to the end of the connection cord 202. By connecting the connection cord 202 with a jack 106 provided on a peripheral side face of the game-machine main unit 100, the operating apparatus 200 is connected to the game-machine main unit 100.

Figure 2:
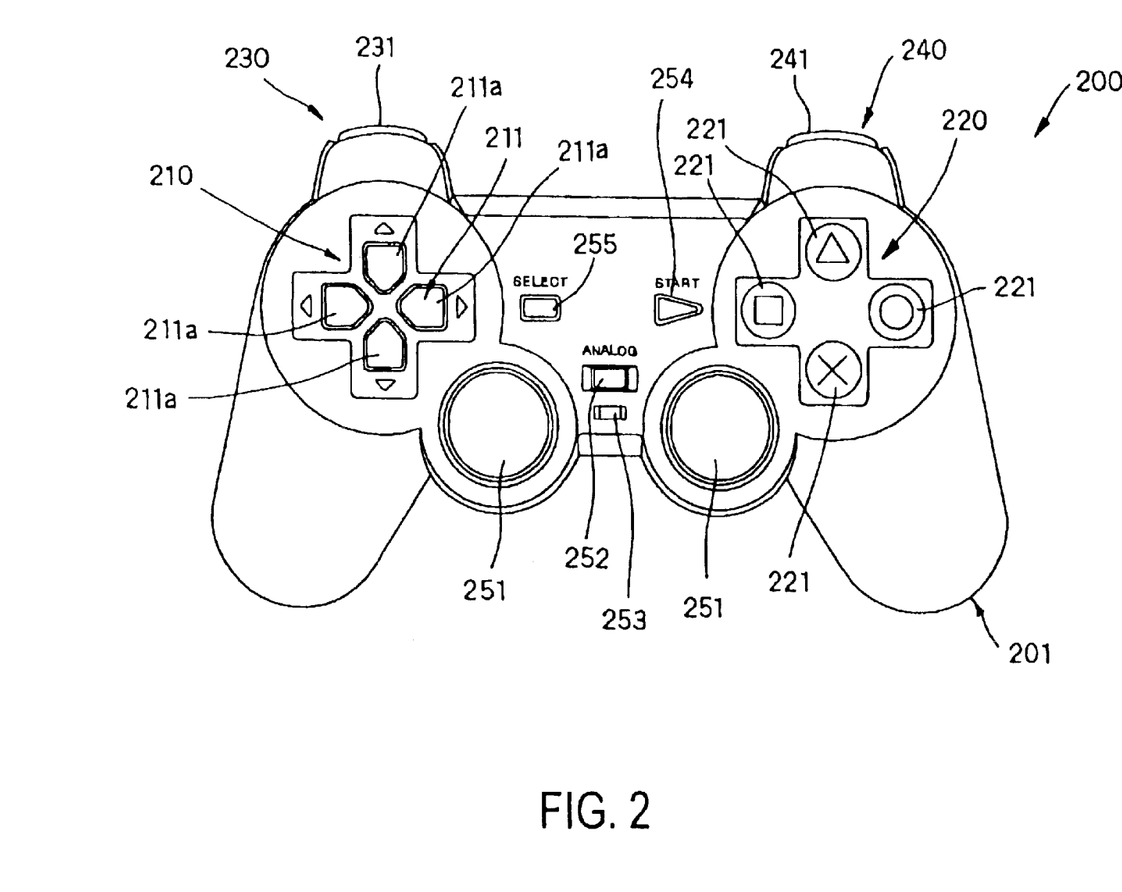
FIG. 2 is an enlarged plan view showing the operating apparatus in FIG. 1.

FIG. 2 is a plan view showing an appearance of the operating apparatus 200. First and second operation sections 210 and 220 are provided on an upper face of the operation-apparatus main unit 201 of the operating apparatus 200. Third and fourth operation sections 230 and 240 are provided on peripheral side faces of the operation-apparatus main unit 201.

The first operation section 210 has a cross-shaped operation member 211 that allows press-operation. From the center of the operation member 211, operation keys 211a individually extending in four directions form operation elements. The first operation section 210 is used to move the character displayed on the TV receiver. The first operation section 210 functions to vertically and horizontally move the character according to press-operations performed on the individual operation keys 211a of the operation member 211.

The second operation section 220 has four columnar operation buttons 221 (operation elements) that allow press-operation. Identification marks, for example, "○" (circle), "□" (square), "Δ" (triangle), and "x" (cross), are individually indicated on head portions of the operation buttons 221 so that the operation buttons 221 can be easily identified. The second operation section 220 is allocated to functions according to the game program recorded on the optical disk. For example, the operation buttons 221 individually correspond to functions of moving the left arm, the right arm, the left leg, and the right leg of the character.

The third and fourth operation sections 230 and 240 have structures that are substantially identical to each other, and have two operation buttons 231 and 241 (operation elements), respectively. The individual operation buttons 231 and 241, vertically arranged (as viewed in the drawing), allow press-operation. The third and fourth operation sections 230 and 240 are allocated to functions according to the game program recorded on the optical disk; for example, each of them is allocated to a function of adding special motions in a game.

In addition, as shown in FIG. 2, the operation-apparatus main unit 201 has joystick-equivalent operating members 251 that are operated to perform analogous operations. The joystick-equivalent operating members 251 become effective when control is switched from the above-described first and second operation sections 210 and 220. The switching is performed using an analog-selecting switch 252 provided on the operation-apparatus main unit 201. When the joystick-equivalent operating members 251 are selected, a display section 253 on the operation-apparatus main unit 201 is illuminated to indicate the selection of the joystick-equivalent operating members 251.

In addition, the operation-apparatus main unit 201 has component members such as a start switch 254 and a selection switch 255. The start switch 254 is operated to issue a command for starting a game. The selection switch 255 is operated to select one of the difficulty levels of a game when the game is started.

Figure 3A:
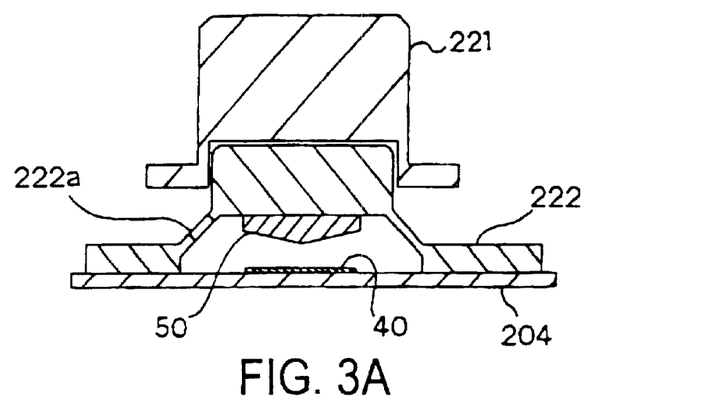
FIGS. 3A to 3C individually show example configurations of a second operation section.
Figure 3B:
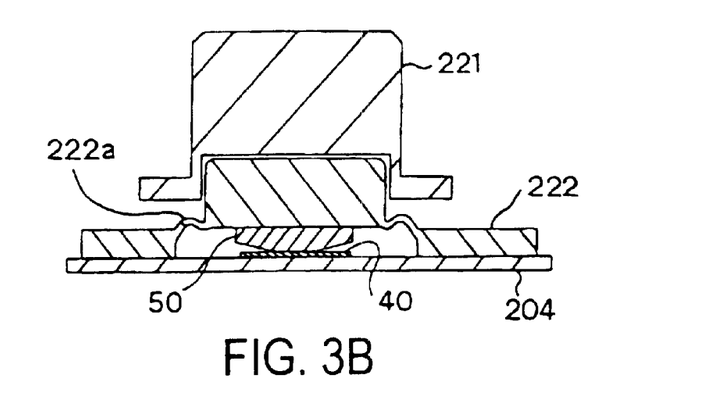
Figure 3C:
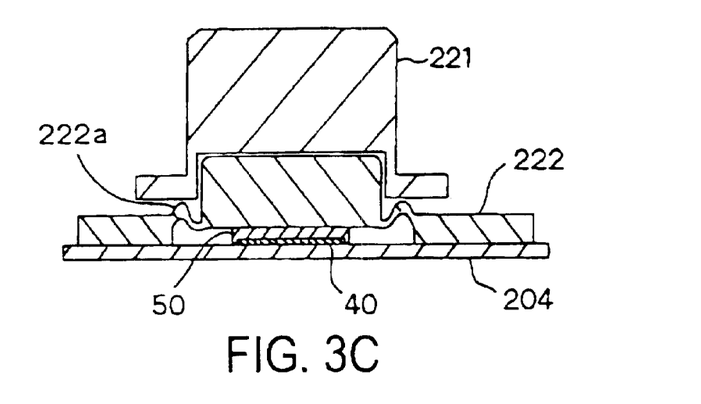

FIGS. 3A to 3C individually show example configurations of the second operation section 220.

The second operation section 220 of the present embodiment has the operation buttons 221, as described above. With each of the operation buttons 221, an elastic material 222, a conductive material 50, and a resistor 40 are provided. The resistor 40 and the conductive member 50 together form a detecting element that outputs analog signals corresponding to press-operations performed on the operation button 221.

The conductive material 50 is, for example, a conductive and elastic rubber material. It is formed in a mountain-like shape with the summit in the center. The conductive material 50 is adhered to an inner ceiling portion of an elastic section 222a formed on the elastic material 222.

The resistor 40 is arranged, for example, on an inner substrate 204 so as to oppose the conductive material 50. The resistor 40 is thus formed so as to be in contact with the conductive material 50 according to a press-operation performed on the operation button 221. As shown in FIGS. 3B and 3C, the conductive material 50 is deformed depending on a pressing force of the operation button 221 (that is, a pressure of contact with the resistor 40). Thereby, the area that contacts the resistor 40 is varied. Specifically, with a low pressure on the operation button 221, the mountain-like conductive material 50 is deformed so that only the vicinity of the summit portion contacts the resistor 40. According to increase in the pressure of the operation button 221, however, the conductive material 50 begins to deform at the summit portion and gradually increases the area contacting the resistor 40.

Figure 4:
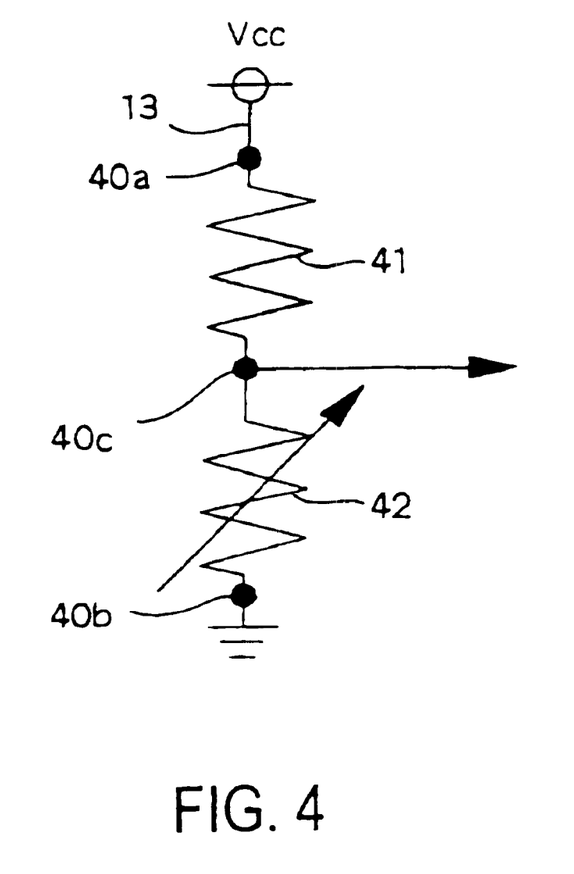
FIG. 4 shows a power line in which a resistor is inserted.

FIG. 4 shows a power line 13 in which the resistor 40 is inserted.

A fixed resistor 42 and a variable resistor 41 are serially inserted to the power line 13, thereby allowing voltage to be applied between electrodes 40a and 40b. The portion of variable resistor 42 is formed by the combination of the resistor 40 and the conductive material 50 of FIGS. 3A–3C, and the value of resistance in the portion varies depending on the contact area of the conductive material 50. Specifically, the conductive material 50 forced to contact the resistor 40 functions as a bridge that permits current to flow into the conductive material 50 instead of the resistor 40 in the contact area, thereby reducing the value of resistance in the contact portion (variable resistor 42). In this manner, the entire device can be understood to be a variable resistor. It should be noted that FIGS. 3A–3C show only the contact portion between the conducting member 50 and the resistor 40 which form the variable resistor of FIG. 4, but fixed resistor 41 of FIG. 4 is omitted from FIGS. 3A–3C.

In the present embodiment, the portion of the variable resistor 42 is connected to a grounded side of the power line 13. In addition, an output terminal 40c is provided between the fixed resistor 41 and the variable resistor 42, namely near the intermediate point of the resistor 40, and thus a voltage stepped down from the applied voltage Vcc by the amount the variable resistance is extracted as an analog signal corresponding to the pushing pressure by the user on the control button 221. This configuration allows the output terminal 40c to produce analog signals corresponding to pressures of the operation button 221. Therefore, the increase in the pressure on the operation button 221 causes the value of resistance of the variable resistor 42 to decrease, thereby lowering voltage levels of individual analog signals outputted from the output terminal 40c.

Figure 5:
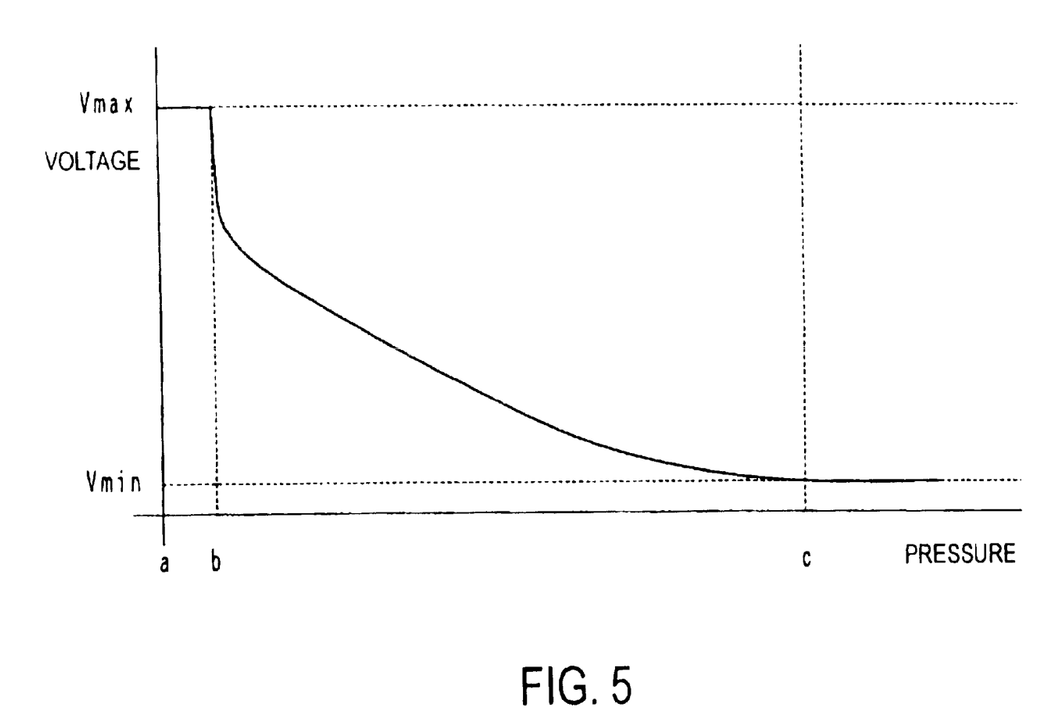
FIG. 5 shows characteristics of an analog signal (voltage) output from an output terminal of the resistor 40.

FIG. 5 shows characteristics of an analog signal (voltage) outputted from the output terminal 40c of the resistor 40.

First, when the power is turned on, and voltage is applied to the resistor 40. Therefore, at this moment, although the operation button 221 is not pressed, the resistor 40 outputs a specific analog signal of a voltage $V_{max}$ (a pressure position represented by the letter "as" in FIG. 5). Subsequently, the operation button 221 is pressed. However, until the conductive material so is forced to contact the resistor 40, no variation occurs in the value of resistance of the variable resistor 42. Accordingly, the output voltage of the analog signal does not vary; that is, it still remains at $V_{max}$.

As the operation button 221 is increasingly depressed so as to force the conductive material 50 to contact the resistor 40 (a pressure position represented by "b" in FIG. 5). Thereafter, according to the increase in the area of the conductive material 50, which is in contact with the resistor 40, the resistance in the portion of the variable resistor 42 of the resistor 40 inversely decreases. This causes the level of the analog signal (voltage) outputted from the output terminal 40c to be lowered. When the conductive material 50 is maximally deformed, the level of the analog signal (voltage) is lowered to the minimum level represented by $V_{min}$ (a pressure position represented by "c" in FIG. 5).

Figure 6:
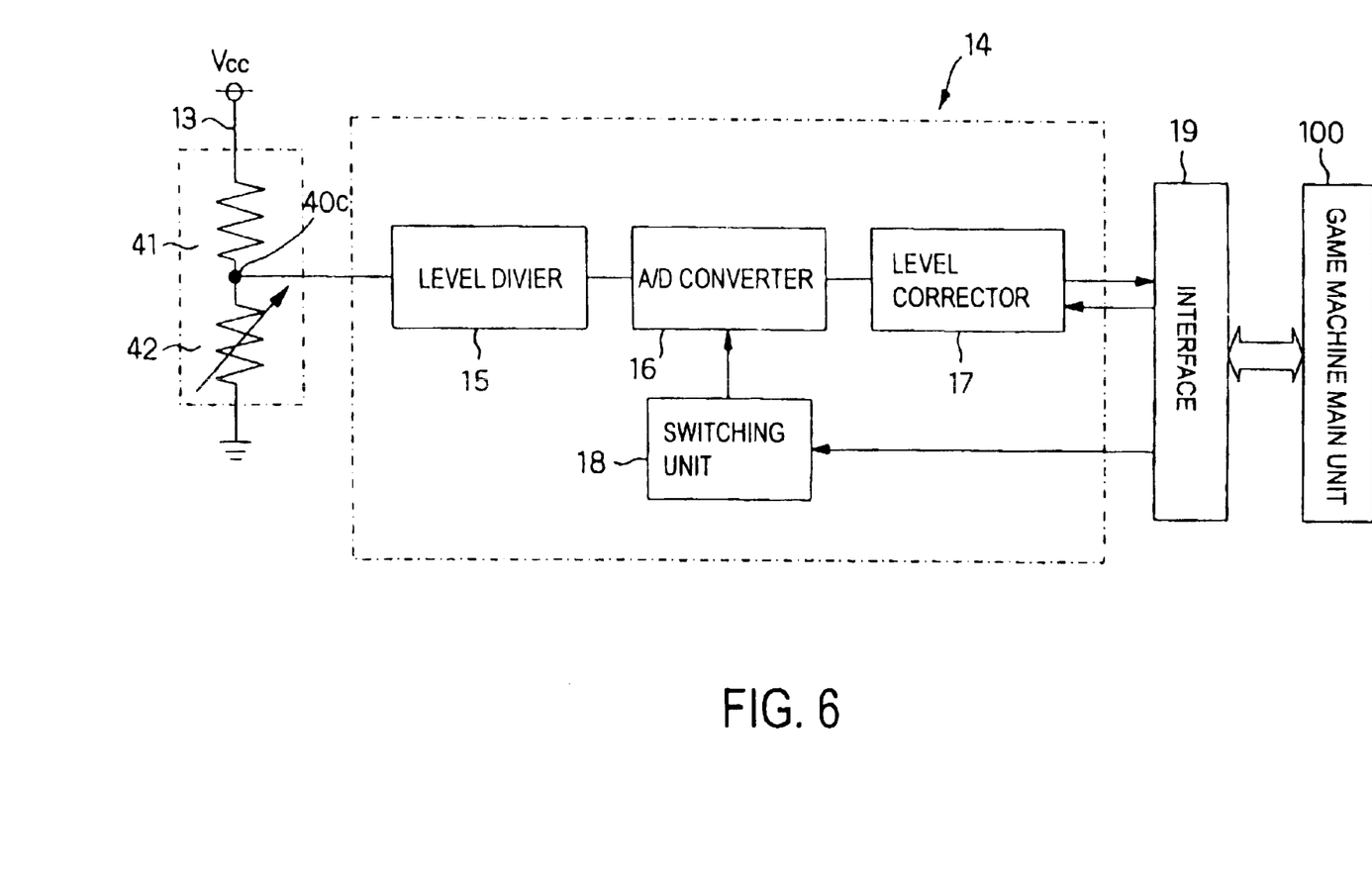
FIG. 6 is a schematic view showing major portions of the operating apparatus according to the embodiment of the present invention.

FIG. 6 is a schematic view showing major portions of the operating apparatus according to the present embodiment.

A microprocessor unit 14 (MPU) is mounted on the inner substrate of the operating apparatus 200. The MPU 14 is delegated to control the operating apparatus 200. The MPU 14 has a level divider 15, an analog-digital converter 16 (A-D converter), a level corrector 17, and a switching unit 18. In the present embodiment, an analog signal (voltage) is outputted from the output terminal 40c and is then inputted to the level divider 15; the range of output levels of the analog signal is divided into a plurality of output levels; and in addition, the analog signal outputted from the resistor 40 is converted into digital signals corresponding to the divisional output levels.

The level divider 15 has a function of equally dividing the output-level range of an inputted analog signal into an arbitrary number of levels. The output-level range and the divisional number of the levels of a signal to be divided can be arbitrarily determined. For example, the level divider 15 equally divides a voltage-level range of 0 to 2.5 V into 256 levels, thereby outputting the analog signal (voltage) outputted from the output terminal 40c corresponding to the individual divisional levels.

The A-D converter 16 outputs digital signals by allocating digital signals that are appropriate to the individual output levels, which have been produced by the level divider 15 as a result of the level-dividing processing. That is, corresponding to the individual divisional output levels, which have been produced by the level divider 15 as a result of the equally-dividing processing, the A-D converter 16 converts the analog signal, outputted from the output terminal 40c, to digital signals and outputs them.

The digital signals outputted from the A-D converter 16 are then sent to the game-machine main unit 100 via an interface 19 provided on the inner substrate of the operating apparatus 200. These digital signals work to execute operation of the game character and the like.

As described above, the variation in the output level of the analog signal outputted from the output terminal 40c of the resistor 40 corresponds to the variation in the pressure received from the operation button 221. Accordingly, the digital signal outputted from the A-D converter 16 also corresponds to the pressure of the operation button 221 operated by a user. Therefore, compared to control according to simple digital signals of ON or OFF individually represented by either 1 or 0, control of the game character according to the digital signals individually corresponding to press-operations performed by the user allows smoother analogous motion of the game character and the like to be implemented.

In addition, in the present embodiment, the A-D converter 16 is designed to concurrently function as a digital signal outputting means for outputting ON and OFF signals (i.e., 1s or 0s) corresponding to analog signals outputted from the output terminal 40c of the resistor 40. Regarding the signal type mentioned above, according to a switching operation performed on the switching unit 18, one of two types of signals, i.e., digital signals converted from an analog signal and digital signals of simple ON and OFF, is selectively outputted.

The switching unit 18 is controlled by control signals that are sent from the game-machine main unit 100 according to the game program recorded on the optical disk. Specifically, depending on the contents of the game program, the control signal sent from the game-machine main unit 100 specifies whether to allow the A-D converter 16 to function either as an analog signal converted digital signal outputting means or as the simple ON an OFF digital signal outputting means. Thus, according to the control signal, the switching unit 18 selectively switches the function.

Depending on the function selected by the switching unit 18, the A-D converter 16 converts the analog signal, outputted from the output terminal 40c of the resistor 40, to one of the analog signal converted digital signal and the simple ON an OFF digital signal, and outputs the selected digital signal. When the function of the analog signal converted digital signal outputting means is selected, the A-D converter 16 converts individual output levels, which were produced by the level divider 15 as a result of the equally-dividing processing, to corresponding digital signals, and outputs the digital signals to the game-machine main unit 100.

When the function of the simple ON and OFF digital signal outputting means is selected, depending on the variation in the analog signal outputted from the output terminal 40c of the resistor 40, the A-D converter 16 outputs one of the binary-coded digital signals, i.e., 1 or 0, to the game-machine main unit 100. Specifically, when the A-D converter 16 recognizes the analog signal outputted from the output terminal 40c of the resistor 40 to be the maximum value $V_{max}$, it determines that the operation button is not pressed, and outputs a digital signal represented by 0. However, when the A-D converter 16 recognizes the analog signal, outputted from the output terminal 40c of the resistor 40, to not be the maximum value $V_{max}$ it determines that the operation button is pressed, and outputs a digital signal represented by 1.

The switching unit 18 may be arranged so as to be manually operated by the user. For example, the arrangement may be such that the function of operating the switching unit 18 is allocated to the analog-selecting switch 252 provided on the operating apparatus 200, the switching unit 18 is operated by manual operation performed on the analog-selecting switch 252, and the function of the A-D converter 16 is thereby switched.

As described above, the level divider 15 equally divides the output-level range of the analog signal outputted from the output terminal 40c within a predetermined range. However, a case can occur where a deviation is caused between the predetermined range and the output-level range of an actual analog signal outputted from the output terminal 40c. In this case, the level divider 15 might not be able to output digital signals that correspond to operational conditions of the operation button 221.

In addition, the materials such as the resistor 40 and the conductive material 50 vary in their individual characteristics, and also, the power voltage is variable. Therefore, depending on the operating apparatus 200, variation can occur in the output range of analog signals outputted from the output terminal 40c, and accordingly, variation can occur in digital signals outputted from the A-D converter 16. To solve these problems, the operating apparatus 200 of the present embodiment has the level corrector 17. Using a predetermined corresponding reference, the level corrector 17 shifts levels of the digital signals and outputs the signals.

Figure 7:
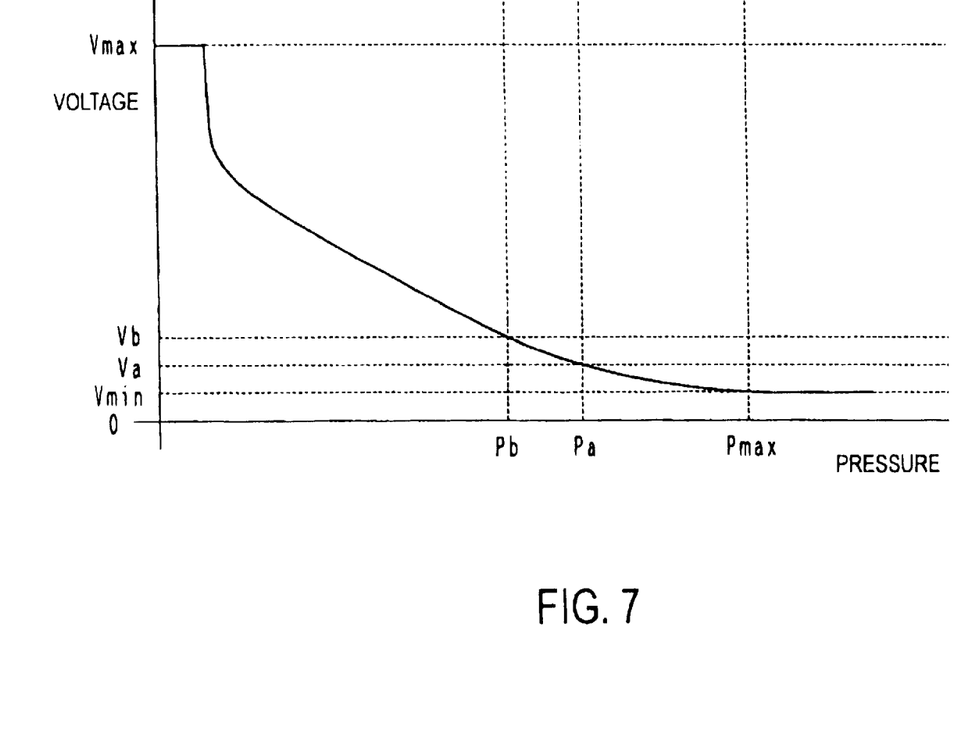
FIG. 7 illustrates a function of a level corrector.

FIG. 7 is a graph that is used to explain functions of the level corrector 17.

Suppose the level divider 15 equally divides an arbitrarily set voltage-level range of 0 to voltage $V_{max}$ into 256 steps. In this case, digital signals corresponding to individual divisional levels are outputted. However, as shown in FIG. 7, the output-level range of the analog signal outputted from the output terminal 40c is $V_{min}$ to $V_{max}$ has a deviation of 0 to $V_{min}$ from the divisional level range set in the level divider 15. Therefore, digital signals in the level range corresponding to 0 to $V_{min}$ are not always output. To solve this problem, the level corrector 17 is set to the corresponding reference, as mentioned above. The corresponding reference is used so that a digital signal outputted from the A-D converter 16 in the range of $V_{min}$ to $V_{max}$ is shifted to the levels of digital signals outputted from the A-D converter 16.

The following lists functional conditions of an example corresponding reference:

(1) A digital-signal output level corresponding to $V_{min}$ is shifted to a digital-signal output level corresponding to 0 V;

(2) A digital-signal output level corresponding to $V_{max}$ is not shifted and is output; and (3) A digital-signal output-level range corresponding to the range of $V_{min}$ to $V_{max}$ is equally shifted within a range of the digital-signal output level corresponding to 0 V to the digital-signal output level corresponding to $V_{max}$.

According to the corresponding reference as described above, output levels of the digital signal output from the A-D converter 16 are shifted. The shifting allows output of digital signals substantially corresponding to the output-level range set in the level divider 15.

The corresponding reference set in the level corrector 17 may be arbitrarily modified. A modified corresponding reference may be such that the corresponding reference described above is assumed to be called a "first level shift", other level shifts are called "second level shifts" and "third level shifts" having functional conditions as listed below are arranged, and one of the level shifts is optionally selected.
(Second Level Shift)
(1) A digital-signal output level corresponding to $V_a$ is shifted to a digital-signal output level corresponding to 0 V;
(2) A digital-signal output level corresponding to voltage $V_{max}$ is not shifted and is output; and
(3) A digital-signal output-level range corresponding to the range of $V_a$ to $V_{max}$ is equally shifted within a range of the digital-signal output level corresponding to 0 V to the digital-signal output level corresponding to voltage $V_{max}$.
(Third Level Shift)
(1) A digital-signal output level corresponding to $V_b$ is shifted to a digital-signal output level corresponding to 0V;
(2) A digital-signal output level corresponding to voltage $V_{max}$ is not shifted and is output; and
(3) A digital-signal output-level range corresponding to the range of $V_b$ to $V_{max}$ is equally shifted within a range of the digital-signal output level corresponding to 0 V to the digital-signal output level corresponding to voltage $V_{max}$.

When the corresponding reference of one of the second and third shifts is selected, digital signals of output levels that correspond to $VV_{min}$ are outputted at either $P_a$ or $P_b$ in a state where the pressure exerted on the operation button 221 reaches the maximum value ($P_{max}$). This implies that digital signals at the maximum level are output according to a soft-touch press operation performed on the operation button 221. Thus, according to the arrangement in which the output level of digital signals output can be modified depending on the pressure exerting on the operation buttons 221, operational characteristics corresponding to the type, etc., of game applications can be obtained. Switching among the described level shifts can be controlled according to, for example, control signals that are sent from the game-machine main unit 100 according to the game program recorded on the optical disk.

Figure 8:
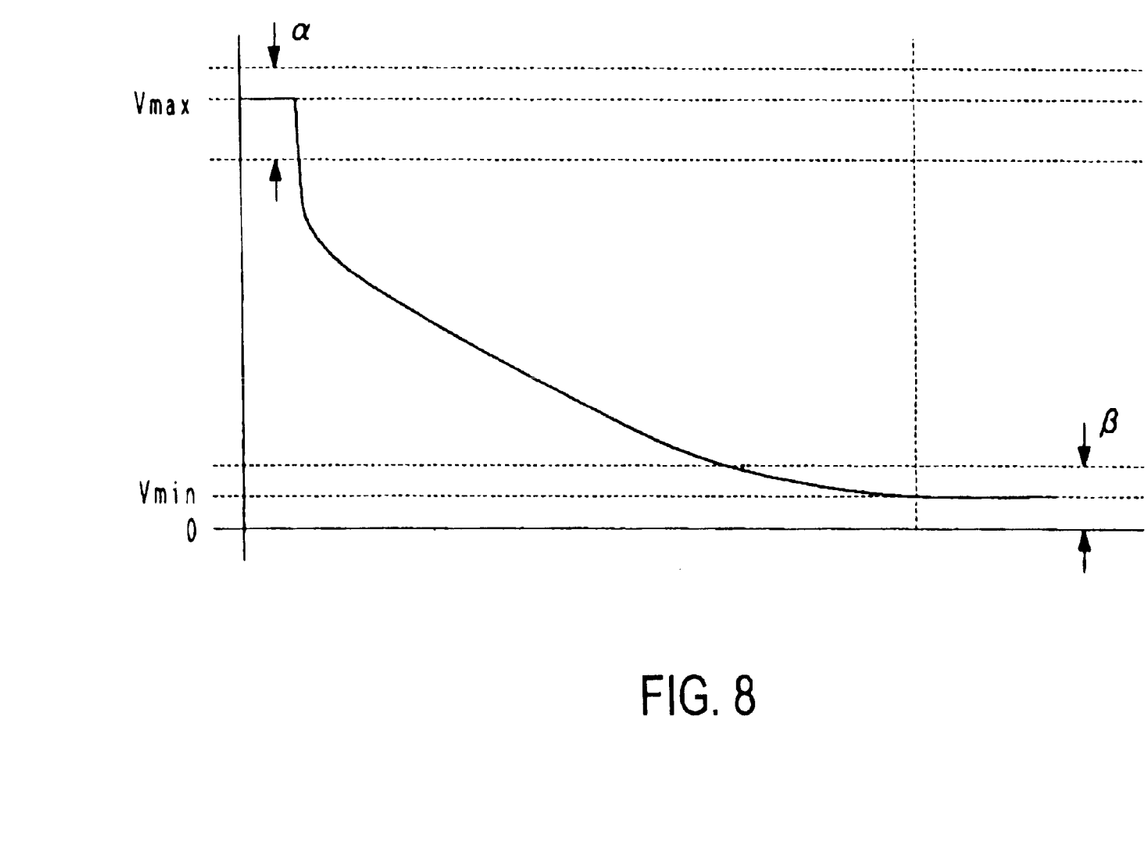
FIG. 8 illustrates functions of a level divider.

FIG. 8 is a graph that is used to explain other functions of the level divider 15.

In the present embodiment, the level divider 15 has a collecting function for collecting output levels. Among output levels of an analog signal that was output from the output terminal 40c according to a press operation performed on the operation buttons 221, the collecting function of the level divider 15 recognizes output levels included in a range α of levels around $V_{max}$ to be output levels corresponding to $V_{max}$, and thereby processes the output levels. Specifically, when the levels of the analog signal outputted from the output terminal 40c are included in the range α, the collecting function impartially recognizes all the levels to be $V_{max}$, and outputs signals of corresponding divisional levels to the A-D converter 16.

In addition, the level divider 15 has a collecting function for collecting output levels. Among output levels of an analog signal that was outputted from the output terminal 40c according to a press operation performed on the operation buttons 221, the collecting function of the level divider 15 recognizes output levels included in a range β of ranges close to 0 V to be output levels corresponding to 0 V, and thereby processes the output levels. Specifically, when levels of an analog signal output from the output terminal 40c are included in the range β, the collecting function impartially recognizes all the levels to be 0 V, and thereby outputs signals of corresponding divisional levels to the A-D converter 16. The described collecting functions of the level divider 15 allow the maximum output level and the minimum output level of an analog signal, which is outputted to the A-D converter 16, to be constant, regardless of the variation in the individual characteristics of the resistor 40 and the conductive material 50 and the variation in the voltage applied to the power line 13.

The present invention is not limited to the described embodiment. For example, the application of the invention is not restricted to the operating apparatus 200, shown in FIG. 2, for the TV game machine. This invention may of course be applied to a variety of other operating apparatuses that can be functionally improved by enabling digital operation and analogous operation.

In addition, the above embodiment is described with reference only to the operation buttons 221 and the configuration related thereto. However, similar configurations may also be employed for component members in other operation sections of the operating apparatus 200 (such as the other operation buttons and the operation elements (keys) 221a in the first operation section 210, and the operation buttons 231 in the third operation section 230, and the operation buttons 241 in the fourth operation section 240).

Furthermore, as a matter of course, the corresponding reference to be set in the level corrector 17 is not limited to that consisting of the above-described level shifts 1, 2, and 3, and it may be optionally determined.

What is claimed is:
1. An operating apparatus, comprising:
(a) press-operational operation elements;
(b) pressure sensitive detector elements, each one associated with one of the press-operational operation elements, for providing analog signals corresponding to press-operations performed on said operation elements, each analog signal having associated therewith an output-level range;
(c) a level divider for dividing the output-level range of each one of the analog signals according to individual divisional output levels and for providing output analog signals by converting an output level of each analog signal to one of the individual divisional output levels;
(d) an analog-digital (A-D) converter for converting, the output analog signals to digital signals corresponding to the individual divisional output levels; and
(e) a level corrector circuit for shifting levels of the digital signals according to a predetermined corresponding reference level, so that the levels of the digital signals are within a specific output-level range.

2. The operating apparatus as claimed in claim 1, wherein said level corrector circuit permits the corresponding reference to be arbitrarily modified.

3. The operating apparatus as claimed in claim 1, wherein said level divider recognizes and processes an output level among the individual divisional output levels included in a predetermined level range to be a maximum level.

4. The operating apparatus as claimed in claim 1, wherein said level divider recognizes and processes an output level among the individual divisional output levels included in a predetermined level range to be a minimum level.

5. The operating apparatus as claimed in claim 1, wherein at least one of said pressure sensitive detector elements comprises a resistor and a deformable conductive element for varying the resistance of said resistor based on an amount of contact between said resistor and said conductive element.

6. A signal-output modulating method for an operating apparatus including pressure sensitive detector elements for providing analog signals corresponding to press-operations performed on the operation elements, the method comprising:

(a) dividing an output-level range of the analog signals into individual divisional output levels;

(b) providing output analog signals by converting output levels of the analog signals to one of the individual divisional output levels;

(c) converting the output analog signals to digital signals; and (d) shifting levels of the digital signals according to a predetermined corresponding reference level, so that the levels of the digital signals are within a specific output-level range.

7. The signal-output modulating method claimed in claim 6, further comprising arbitrarily modifying the corresponding reference.

8. The signal-output modulating method as claimed in claim 6, further comprising recognizing and processing an output level among the individual divisional output levels included in a predetermined level range to be a maximum level.

9. The signal-output modulating method as claimed in claim 6, further comprising recognizing and processing an output level among the individual divisional output levels included in a predetermined level range to be a minimum level.

10. An operating apparatus, comprising:

(a) press-operational operation elements;

(b) means for providing analog signals corresponding to press-operations performed on said operation elements;

(c) means for dividing an output-level range of the analog signals into individual divisional output levels and for providing output analog signals by converting output levels of the analog signals to one of the individual divisional output levels;

(d) means for converting the output analog signals to digital signals corresponding to the individual divisional output levels; and (e) means for shifting levels of the digital signals according to a predetermined corresponding reference level, so that the levels of the digital signals are within a specific output-level range.

11. The operating apparatus as claimed in claim 10, wherein said means for shifting permits the corresponding reference to be arbitrarily modified.

12. The operating apparatus as claimed in claim 10, wherein said means for dividing recognizes and processes an output level among the individual divisional output levels included in a predetermined level range to be a maximum level.

13. The operating apparatus as claimed in claim 10, wherein said means for dividing recognizes and processes an output level among the individual divisional output levels included in a predetermined level range to be a minimum level.

14. The operating apparatus as claimed in claim 10, wherein at least one of said pressure sensitive detector elements comprises a resistor and a deformable conductive element for varying the resistance of said resistor based on an amount of contact between said resistor and said conductive element.

15. An operating apparatus, comprising:

(a) press-operational operation elements;

(b) pressure sensitive detector elements, each one associated with one of the press-operational operation elements, for providing analog signals corresponding to press-operations performed on said operation elements, each analog signal having associated therewith an output-level range;

(c) a level divider for dividing the output-level range of each one of the analog signals according to individual divisional output levels and for providing output analog signals by converting an output level of each analog signal to one of the individual divisional output levels;

(d) an analog-digital (A-D) converter for converting the output analog signals to digital signals corresponding to the individual divisional output levels; and (e) a level corrector circuit for shifting levels of the digital signals according to a predetermined corresponding reference;

wherein said level corrector circuit permits the corresponding reference to be modified according to control signals sent from an entertainment apparatus.

16. The operating apparatus as claimed in claim 15, wherein said level divider recognizes and processes an output level among the individual divisional output levels included in a predetermined level range to be a maximum level.

17. The operating apparatus as claimed in claim 15, wherein said level divider recognizes and processes an output level among the individual divisional output levels included in a predetermined level range to be a minimum level.

18. The operating apparatus as claimed in claim 15, wherein at least one of said pressure sensitive detector elements comprises a resistor and a deformable conductive element for varying the resistance of said resistor based on an amount of contact between said resistor and said conductive element.

19. A signal-output modulating method for an operating apparatus including pressure sensitive detector elements for providing analog signals corresponding to press-operations performed on the operation elements, the method comprising:

(a) dividing an output-level range of the analog signals into individual divisional output levels;

(b) providing output analog signals by converting output levels of the analog signals to one of the individual divisional output levels;

(c) converting the output analog signals to digital signals;

(d) shifting levels of the digital signals according to a predetermined corresponding reference; and (e) modifying the predetermined corresponding reference according to control signals sent from an entertainment apparatus.

20. The signal-output modulating method as claimed in claim 19, further comprising recognizing and processing an output level among the individual divisional output levels included in a predetermined level range to be a maximum level.

21. The signal-output modulating method as claimed in claim 19, further comprising recognizing and processing an output level among the individual divisional output levels included in a predetermined level range to be a minimum level.

22. An operating apparatus comprising:
(a) press-operational operation elements;
(b) means for providing analog signals corresponding to press-operations performed on said operation elements;
(c) means for dividing an output-level range of the analog signals into individual divisional output levels and for providing output analog signals by converting output levels of the analog signals to one of the individual divisional output levels;
(d) means for converting the output analog signals to digital signals corresponding to the individual divisional output levels; and
(e) means for shifting levels of the digital signals according to a predetermined corresponding reference;
wherein said means for shifting permits the corresponding reference to be modified according to control signals sent from an entertainment apparatus.

23. The operating apparatus as claimed in claim 22, wherein said means for dividing recognizes and processes an output level among the individual divisional output levels included in a predetermined level range to be a maximum level.

24. The operating apparatus as claimed in claim 22, wherein said means for dividing recognizes and processes an output level among the individual divisional output levels included in a predetermined level range to be a minimum level.

25. The operating apparatus as claimed in claim 22, wherein the means for providing includes at least one pressure sensitive detector element comprising a resistor and a deformable conductive element for varying the resistance of said resistor based on an amount of contact between said resistor and said conductive element.

\* \* \* \* \*

UNITED STATES PATENT AND TRADEMARK OFFICE
CERTIFICATE OF CORRECTION

PATENT NO. : 6,607,442 B2
DATED : August 19, 2003
INVENTOR(S) : Hiroki Ogata, Kazusato Tagawa and Hiroyuki Nakazawa It is certified that error appears in the above-identified patent and that said Letters Patent is hereby corrected as shown below:

Column 6,
Line 28, delete "as" and insert therefor -- a --.
Line 30, delete "so" and insert therefor -- 50 --.

Column 8,
Line 8, after "$V_{max}$" insert -- , --.

Column 10,
Line 50, delete ",".

Signed and Sealed this

Sixteenth Day of December, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,607,442 B2  
DATED : August 19, 2003  
INVENTOR(S) : Hiroki Ogata, Kazusato Tagawa and Hiroyuki Nakazawa Page 1 of 1

It is certified that error appears in the above-identified patent and that said Letters Patent is hereby corrected as shown below:

<u>Title page,</u>  
Insert Item  
-- [74] *Attorney, Agent or Firm*—Lerner, David Littenberg, Krumholz & Mentlik --

<u>Column 6,</u>  
Line 28, delete "as" and insert therefor -- a --.  
Line 30, delete "so" and insert therefor -- 50 --.

<u>Column 8,</u>  
Line 8, after "$V_{max}$" insert -- , --.

<u>Column 10,</u>  
Line 50, delete ",".

This certificate supersedes Certificate of Correction issued December 16, 2003.

Signed and Sealed this

Thirteenth Day of July, 2004

JON W. DUDAS  
*Acting Director of the United States Patent and Trademark Office*